United States Patent Office 3,111,513
Patented Nov. 19, 1963

3,111,513
OXIDATION DERIVATIVES OF CELLULOSE CRYSTALLITE AGGREGATES
Orlando A. Battista, Drexel Hill, and Edwin G. Fleck, Jr., Wallingford, Pa., and Edward W. Neumann, Claymont, Del., assignors, by mesne assignments, to FMC Corporation, San Jose, Calif., a corporation of Delaware
No Drawing. Filed Jan. 13, 1960, Ser. No. 2,133
12 Claims. (Cl. 260—212)

This invention relates to derivatives of cellulose crystallite aggregates, and more particularly to oxidized derivatives thereof. It further relates to useful applications of the derivatives.

Cellulose crystallite aggregates are products obtained by the controlled acid hydrolysis of cellulose, there being formed an acid-soluble portion and an acid-insoluble portion. The latter comprises a crystalline residue or remainder which is washed and recovered, being referred to as cellulose crystallite aggregates, or as level-off D.P. (degree of polymerization) cellulose.

Interesting and unusual properties have been noted when oxidation derivatives are prepared from these aggregates, particularly aldehyde and carboxyl derivatives, and it is a principal object of the invention to provide such derivatives. The properties referred to tend to be reflected in the preparative procedures as well as in the applications of the derivatives. The aggregates themselves are of unusual interest, being unlike any other known forms of cellulose, and for these reasons will be described in some detail.

In the acid hydrolysis described, the acid dissolves amorphous portions of the original cellulose chains, the undissolved portions being in a particulate, non-fibrous or crystalline form as a result of the disruption of the continuity of the fine structure between crystalline and amorphous regions of the original cellulose. Although hydrolysis may be effected by various specific methods, a direct method which is free of secondary reactions, and which is employed in the present invention, comprises the treatment of the original cellulosic material with 2.5 normal hydrochloric acid solution for 15 minutes at boiling temperature. The cellulose undergoing such treatment reaches, within the time period noted, a substantially constant molecular weight, or in other words, the number of repeating units or monomers, sometimes designated anhydroglucose units, which make up the cellulosic material, becomes relatively constant, from which it is apparent that the degree of polymerization of the material has leveled off, hence the name level-off D.P. cellulose. In other words, if the hydrolysis reaction were continued beyond the period noted, the D.P. would change very little if at all. In all cases, the level-off D.P. value reflects the fact that destruction of the fibrous structure has occurred as a result of the substantially complete removal of the amorphous regions of the original cellulose. As indicated by X-ray diffraction tests, the crystallites have a sharp diffraction pattern indicative of a substantially crystalline structure. Although the crystallite chains are of very uniform lengths, particularly by comparison with the original cellulose chains, strictly speaking they do exhibit some variation, and for this reason it is preferred to speak of average lengths, or of average level-off D.P. values.

It may be observed that "crystallites," as used herein, are clusters of longitudinally disposed, closely packed cellulose chains or molecules, and that "aggregates" are clusters of crystallites. The aggregates may also be said to comprise straight, rigid, relatively non-twistable groups of linear chains.

The hydrolysis method noted above is particularly characterized by the fact that in each crystallite aggregate resulting from the hydrolysis, no constituent chain is connected to a chain in a neighboring aggregate; rather, all the chains in an aggregate are separate from and free of those in neighboring aggregates.

The cellulose crystallite aggregates, or level-off average D.P. cellulose, suitable for use in the invention is characterized by having a level-off average D.P. in the range of 15 to 375. It will be convenient to consider this over-all range in terms of three smaller component ranges: a high range of 125 to 375, from which derivatives of higher molecular weight are obtainable; an intermediate range of 60 to 125, which gives rise to derivatives of intermediate molecular weight; and a low range of 15 to 60, which produces lower molecular weight derivatives.

Referring to the crystallite material in the first or high level-off average D.P. range, it would be ideal if within this range all of the material had the same D.P., or chain length, but as this is difficult if not impossible to achieve, it is preferred that the material shall be made up of chains of restricted lengths; thus, at least 85% of the material should have an actual D.P. of not less than 50 and not more than 550. More preferably, at least 90% of the material should have an actual D.P. within the range of 75 to 500, and it is still more preferred if at least 95% of the material has an actual D.P. in the range of 75 to 450. It may thus be apparent that the chain length of the cellulose crystallite aggregates of a level-off average D.P. of 125 to 375 is very uniform, a consequence of the hydrolysis, wherein the longer chains of the original cellulose were converted to shorter chains and the very short chains were dissolved away. In other words, the hydroylsis effected a homogenization of the chain length distribution. As may also be apparent, a reference to cellulose crystallites having, for example, a level-off average D.P. of 125 means that the crystallites have an average chain length corresponding to 125 anhydroglucose units, and in accordance with the first preference noted above, at least 85% of this material will be made up of chains containing 50 to 550 such units; the remaining 15% may comprise shorter and/or longer chains. Preferably, the level-off average D.P. is in the range of 200 to 300, of which material about 90% has an actual D.P. in the range of 75 to 550.

Associated with the foregoing D.P. properties of the crystallites is the fact that their chemical purity is very high, the material comprising at least 95%, preferably at least 97 or 99%, polyglucose, or anhydroglucose units, based on chromatographic analysis. It may be explained in this connection that the inorganic contaminants in the original cellulose, which are concentrated in the amorphous regions thereof, are dissolved away by the hydrolyzing acid, and the non-cellulose components of the original material are so effectively destroyed that their concentration is reduced to a very low level. Of interest is the fact that the chains produced by the hydrolysis, regardless of their level-off average D.P. value, each have on one end thereof a potential aldehyde group, such group being in the 1 position of an end anhydroglucose unit and requiring the assistance of the ring oxygen atom, which is ortho to it, to realize its aldehydic potential. The group has the reducing properties of an aldehyde group. On their other ends the chains have only hydroxyls as functional groups.

The source material for the crystallite aggregates may suitably be one or more natural fibers such as ramie, cotton, purified cotton, also bleached sulfite pulp, bleached sulfate wood pulp, etc. Particularly suitable are sulfite pulp which has a level-off average D.P. of 200 to 300, of which 90% has an actual D.P. in the range of 75 to 550; and also sulfate pulp which has a level-off average D.P. of 125 to 175, of which 90% is in the range of 50 to 450.

The crystallites are desirably used in finely divided form, say in a particle size ranging from less than 1 micron to 250 microns, more particularly from 1 or 2 to 40, 60 or 100 microns. It is preferred that at least 95% of the aggregates have a particle size of 1 to 10 microns, and more preferably 1 to 2 microns. The moisture content of the aggregates may be as high as 50% but is generally less than 15%, preferably less than 8 to 10%, and more preferably less than 5%.

The cellulose crystallites of the low level-off average D.P. range of 15 to 60 have a chemical purity comparable to that described above, a like moisture content, and are preferably used in the same general particle size range. The crystallites are suitably prepared from regenerated forms of cellulose, including tire and textile yarns, other regenerated cellulose fibers, and cellophane. The crystallites are useful for conversion to derivatives which tend to be more soluble and clearer in appearance.

The cellulose crystallites of the intermediate level-off average D.P. range of 60 to 125 may have the chemical purity, moisture content, and particle size ranges noted above. The crystallites are obtainable from the acid hydrolysis of alkali-swollen natural forms of cellulose, of which a preferred source is cellulose that has been mercerized by treatment with 18% caustic soda solution at 20° C. for 2 hours. The derivatives exhibit properties generally intermediate those of the derivatives from the crystallites of the low and high D.P. ranges, respectively.

Referring generally to the crystallites in the over-all level-off average D.P. range of 15 to 375, it may further be noted that as obtained from the acid hydrolysis and water washing steps, the cellulose crystallites are in a loosely aggregated state and are characterized by the presence of many cracks or fissures in their surfaces. Because of such cracks, the apparent density of the crystallites is much less than their absolute density. Furthermore, the cracks persist despite the application of high compressive forces on the crystallites. Thus, when the crystallites are compressed at 5,000 p.s.i., they exhibit an apparent density of 1.26; at 10,000 p.s.i. the apparent density rises to 1.32; at 15,000 p.s.i. it is 1.34; and at 25,000 and 37,000 p.s.i. it is 1.38 and 1.38, respectively. On the other hand, the absolute density of a unit crystal or crystallite is 1.55, from which it is apparent that the crystallites occlude considerable quantities of air in the surface cracks and fissures.

By virtue of their unique properties, the cellulose crystallites give rise to a number of interesting and useful, more or less particular derivatives, including the aldehyde, carboxyl, and mixed aldehyde-carboxyl derivatives, all of these containing one or more carbonyl C=O linkages in the form of the aldehyde and/or carboxyl groups, as will be apparent.

Considering the aldehyde derivatives, and in particular the dialdehyde derivatives, they are suitably prepared by the oxidation of the cellulose crystallites with periodic acid, an oxidizing agent which specifically opens the anhydroglucose ring at the 2,3 position and which converts the hydroxyl groups at those positions to aldehyde groups. During the reaction, the periodic acid is reduced to iodic acid. It is possible to stop the reaction at any time as by simply pouring the reaction mixture onto a filter, thus mechanically separating the solid crystallites, and any solid reaction product, from the oxidizing agent which is in aqueous solution. Thus it is possible, at least theoretically, to make a derivative having as few as two aldehyde groups and as many as twice the number of anhydroglucose units in the crystallites. For example, if the crystallites have a level-off average D.P. of 125, it is possible to form a derivative having an average of 250 aldehyde groups. The solid derivative product is readily filterable, by contrast with the original crystallite material which gives a milky dispersion in water which cannot be filtered. Derivatives having a copper number in the range of 2 or 3 to 66 or more, usually 30 to 53, are obtainable without difficulty. The range of 30 to 53 is considered to be indicative of an aldehyde content of 12 to 15%. Copper number is defined as the grams of metallic copper in the cuprous oxide resulting from the reduction of copper sulfate by 100 grams of the aldehyde derivative of the crystallites. For making the dialdehyde and other derivatives, it is preferred that the crystallite material shall not have been dried after its preparation; a useful form of such material is designated "never dried" and comprises about 40% crystallites and 60% water.

As shown in Example 1, when the dialdehyde is dried in an oven at 65° C. and atmospheric pressure, it forms a clear, moisture-resistant plastic mass. This plastic mass tends to be clearer as the particle size of the cellulose crystallites, from which the dialdehyde is prepared, becomes smaller. For making such clear plastic masses, it is preferred that the crystallites have a particle size below 44 microns and preferably below 20 microns. Preferably, too, the dialdehyde derivative should have a copper number of at least 50, and more preferably at least 60.

Another useful oxidizing agent is lead tetra-acetate, which like the periodic acid, selectively breaks the 2, 3 bond of the anhydroglucose units and converts the 2- and 3-hydroxyls to aldehyde groups.

A particularly useful method for preparing dialdehyde derivatives comprises electrolyzing a sodium iodate solution in the presence of the crystallites. Periodic acid is formed in the electrolyzing cell in the vicinity of the anode and serves to oxidize the crystallites to the dialdehyde derivative.

The dialdehydes are of value as dielectric materials, as plastic compositions, as intermediates for preparing other useful materials, etc.

Of interest in this connection is the fact that the plastic compositions are hydroplastic, by which is meant that they are moldable by means of heat and pressure and in the presence of water. In other words, if the hydroplastic, suitably in the form of a white powder, is mixed with water and then heated under pressure, the material becomes clear, and after cross-linking takes place, it becomes hard or sets, resembling a thermosetting plastic in the foregoing processes. Cross-linking may take place intermolecularly, as through the reaction of an aldehyde group on one chain with a hydroxyl group on a neighbor chain, water splitting out in this reaction; or it may take place intramolecularly, as through the reaction of an aldehyde group on one chain with a hydroxyl group on the same chain, water again splitting out. Cross-linking occurs when the hydroplastic is heated under pressure with water, and in the result, the molded article or structure so produced exhibits high resistance to exposure to high humidity. The structure is not only useful as a dielectric but also as a plastic article capable of replacing articles of conventional wood or of vulcanized fiber, such as bobbins for yarn.

A further use for the dialdehyde derivatives is as a binder, with which there may be incorporated a filler, such as conventional wood flour, and the mixture subjected to molding to produce useful articles. The unreacted cellulose crystallites themselves may serve as a filler instead of or in addition to the wood flour. If desired, carboxyl derivatives of the types described below may serve as the filler either alone or in conjunction with the unreacted cellulose crystallites and either in the presence or absence of wood flour. An advantage in using carboxyl derivatives as the filler is that some reaction may take place between the carboxyl groups of the filler and the aldehyde groups of the binder.

In the foregoing uses of the dialdehyde derivatives, it is preferred that they have a copper number of at least 50, and that the crystallites from which they are made have a particle size below 10 or 20 microns.

Carboxyl derivatives are conveniently made by oxidizing the crystallites with nitrogen dioxide, an agent that specifically oxidizes the hydroxyl groups attached to the 6 carbon of the anhydroglucose ring. The 6 carbon, of course, comprises the side chain which is attached to the 5 carbon of the ring. The amount of nitrogen dioxide and/or the duration of contact with the crystallites determines the extent of the conversion of hydroxy groups to carboxyl, as illustrated in Example 6. It is practical to make carboxy derivatives containing from 0.7 to 15% by weight of carboxyl.

Another preparation for the carboxy compounds is to oxidize the dialdehyde derivatives, as by means of hydrogen peroxide, the resulting carboxylated material having carboxyl groups at the 2 and 3 positions of the anhydroglucose ring.

By converting carboxyl derivatives of intermediate carboxyl content to their sodium salts, highly water-dispersible compounds are obtained characterized not only by having a particular degree of insolubility, but also by being in the form of discrete, non-fibrous particles of a size below about 10 microns, suitably 5 to 10 microns, or even from 0.1 to 10 microns. The carboxy derivatives are useful as intermediates for preparing other materials. They have value as a filler material in the preparation of various plastics like urea-formaldehyde, melamine-formaldehyde, polyamides, polyesters, polyolefins, polyurethans, etc., where the presence of the carboxyl groups of the filler provides an opportunity for reaction to take place with the amino groups of the plastics or plastics' ingredients. Thus, the carboxyl derivatives would function more like reactants than conventional fillers.

In addition to derivatives containing substantially only aldehyde or carboxyl groups, derivatives may be prepared containing both radicals. Thus, by treating an aqueous dispersion of the crystallites with hypochlorite, a derivative is readily obtainable having both aldehyde and carboxy groups. Preferably, either sodium or calcium hypochlorite is employed, this agent being shaken with the crystallites dispersion and the resulting mixture allowed to stand. By adjusting the pH of the mixture, a variation in the proportion of aldehyde to carboxy groups may be obtained; for example, if the pH is made alkaline, less aldehyde and more carboxy groups tend to form than when the pH is neutral. Another suitable oxidizing agent is hydrogen peroxide which under the influence of heat can convert the crystallites to a mixed aldehyde and carboxyl derivative. Chromic acid and $CrO_3$-containing agents, such as potassium dichromate, are other useful oxidants requiring only simple mixing with the crystallites dispersion, the amount or extent of carboxyl formation being dependent on the duration of contact. The reaction may be accelerated by using a permanganate-containing agent such as potassium permanganate, but in this case it is more difficult to obtain a purer product.

The mixed aldehyde-carboxyl derivatives comprise hydroplastics. They are suitable as paste thickeners, i.e., they form pastes of any desired consistency or thickness; and they may be used as thickeners for printing ink to control the viscosity. It is preferred in these cases that the derivatives, or the crystallites from which they are made, have a particles size of 5 to 20 microns. Also, in view of their smooth, pasty texture, the mixed aldehyde-carboxyl derivatives are of value in foods as thickeners, texturizers, bulking agents, bases for spreads, and the like. The derivatives are further valuable as intermediates.

Other interesting derivatives comprise those in which the crystallite chains are modified prior to the formation of the derivatives. As indicated above, during the acid hydrolysis of cellulosic material to form uniform chain lengths of cellulose crystallites, each chain so produced has a potential aldehyde group on one end. As this group may survive the conversion of the crystallites to a derivative, the resulting derivative is characterized by having such group in the 1 position of end anhydroglucose units of the crystallite chains. For example, one such contemplated derivative is the carboxyl, formed by oxidation of the crystallites with nitrogen dioxide, the carboxyl group being formed in the 6 carbon position, and the potential aldehyde group being on the 1 carbon. If desired, the starting crystallites may be treated with a reducing agent, such as sodium borohydride, to reduce the potential aldehyde groups to hydroxyl; the end units of the crystallite chains would then have only hydroxyls as functional groups, a total of five hydroxy groups being present. The reduced crystallite aggregates may then be converted to oxidation derivatives. Illustrative of the latter are those obtained by means of hydrogen peroxide or nitrogen dioxide, the resulting derivatives having a carboxyl group on the 1 carbon, and usually having one or more carboxyls in other positions. The borohydride is preferably added in successive small amounts to an aqueous dispersion of the crystallites, the temperature being kept at or near room temperature although it may range to about 50° C. When the reaction is completed, any excess reagent present may be destroyed as by addition of acid. Other useful reducing agents are alkali borohydrides such as those of potassium and lithium, aluminum alkoxides, and also the alkoxides of sodium, magnesium, zirconium and tin, these alkoxides usually being employed in alcoholic solution. Aluminum isopropoxide in isopropanol and aluminum ethoxide in ethanol are generally used reducing agents. Still other agents include alkoxy magnesium halides, lithium aluminum hydride, sodium and sodium amalgam, aluminum amalgam, zinc dust plus acetic acid, etc.

Instead of reducing the end aldehydic groups on the aggregates, as described, they may be oxidized to carboxyl, and the resulting aggregate material converted to a desired derivative. The oxidizing step may suitably be performed by adding hydrogen peroxide to an aqueous dispersion of the crystallites, then adding caustic soda to catalyze the decomposition of the peroxide, and thereafter heating the mixture, while on the alkaline side, preferably at a pH of about 11, for several hours at or near 100° C. Another useful agent is sodium hypochlorite which is mixed with the aggregates at room temperature, the pH is then adjusted to an alkaline value of at least 10.4, preferably 11.8, and after standing several hours, the solution is filtered. Other useful oxidizing agents include calcium hypochlorite, nitrogen dioxide, chromic acid, permanganate, etc. Also bromine water, mercuric oxide, alkyl hydroperoxides, oxygen, nitric acid, silver oxide, ammoniacal solutions of silver nitrate containing some alkali and peracids like peracetic acid.

The invention may be illustrated by the following examples.

*Example 1*

About 50 g. of never-dried cellulose crystallite aggregates having a level-off average D.P. of 220 were dispersed in a liter of water. The never-dried material comprised 40% solids and the balance water, so that on a dry basis 20 g. of the aggregates were present. The crystallites had a particle size in the range of below 1 to 250 microns, of which about 10% had a size below 44 microns, about 40% were in the range of 44 to 74 microns, and 40 to 50% were above 74 microns. To the dispersion there were added 96 g. of periodic acid, making the resulting mixture 0.5 molar with respect to such acid, or 2.6% by weight on a percentage basis. Then 49 g. of concentrated (98%) sulfuric acid were added to the mixture, the latter thus containing 0.49% of sulfuric acid, after which the mixture was stirred at room temperature for 90 hours. The mixture was readily filtered, and the resulting white solids washed thoroughly with water. The product comprised the dialdehyde derivative of the starting cellulose crystallites; it was a porous, sponge-like or rubbery, easily broken, granulatable material completely soluble in alkali. It had a copper number of about 60, as determined by the Hagguland method, T215–M50, a standard TAPPI method.

A portion of the dialdehyde derivative of this example, after filtration and water washing, was subjected to drying in an oven at 65° C. and atmospheric pressure. In the course of the drying step, the derivative changed to a clear plastic mass.

*Example 2*

A mixed aldehyde- and carboxyl-containing derivative was prepared by first mixing 1500 g. of never-dried cellulose crystallite aggregates of the kind used in Example 1 with 2800 cc. of aqueous sodium hypochlorite solution (containing 5% by weight of chlorine) at room temperature, and the resulting mixture was diluted with water to a volume of 4000 cc. The chlorine content of the diluted solution was 3.5% by weight. The pH of the solution, which had been on the alkaline side, was then adjusted to 7.0 and the solution allowed to stand overnight. It was filtered and the filter cake washed with water to yield a white pasty material having a copper number of 27.6. The starting cellulose crystallites had a copper number of 2.6.

*Example 3*

The preparation of Example 2 was repeated except that the pH was left on the alkaline side, being adjusted to pH of 9. The resulting derivative was similar in appearance to that of Example 2, but had a higher carboxyl and a lower aldehyde content.

*Example 4*

The work of Example 2 was repeated except that the cellulose crystallites had a level-off average D.P. of 35 to 45; the resulting white solid derivative had a copper number of 26 as compared to 15 for the original crystallites. The derivative in the wet or undried state had a smoother and pastier texture than the starting crystallites, and upon drying, it formed a granular material which could be broken quite easily.

*Example 5*

A mixed aldehyde- and carboxyl-containing derivative was prepared by forming a mixture of 55 g. of cellulose crystallites of the kind used in Example 1 and 220 g. of hydrogen peroxide (30% by weight solution) and then adding water to form a total volume of 1100 cc. The peroxide content of the over-all solution was 6% by weight. Then 5.5 g. (0.5% by weight) of caustic soda were added to the mixture to catalyze the decomposition of the peroxide. The mixture was heated at 90–95° C. for 5 hours, after which it was poured onto a filter, most of the mixture passing through the filter. In other words, the derivative was so highly dispersed in the solution that it would not filter out.

*Example 6*

Cellulose crystallites having a level-off average D.P. of 220 in an amount of 20 g. were dispersed in 500 cc. of carbon tetrachloride at room temperature and the mixture then placed in a pressure bottle. Liquefied nitrogen dioxide, together with the dimer thereof which is formed when the dioxide comes in contact with air, was bubbled through the contents of the bottle for 2 to 3 minute periods every 20 minutes for an hour. After allowing the contents to stand, the product was removed from the bottle, washed thoroughly with carbon tetrachloride and then with acetone. The solids were dried in a forced air draft at 60° C. for 1 hour to yield a carboxyl derivative in the form of a white powder which was soluble in dilute aqueous caustic solution. The carboxyl content of the derivative was determined to be 0.68% by weight.

The foregoing experiment was repeated except that the nitrogen dioxide was bubbled through the mixture in the pressure bottle for a period of 10 minutes, after which the mixture was stirred for 1½ hours, filtered and washed. The carboxyl content was 1.35%.

The experiment was again repeated, using 5 grams of cellulose crystallites and 85 grams of carbon tetrachloride. To this mixture there was added 15 grams of nitrogen dioxide at 25° C. over a total time of about 2¼ hours. The resulting product was removed, washed, dried, and on analysis was found to contain 3.52% of carboxyl.

On continuing the last experiment, except that the nitrogen dioxide was reacted with the crystallites for about 17¼ hours, the resulting product was found to contain 7.8% carboxyl. Over a reaction time of 40 hours, the carboxyl content was 12.2%.

*Example 7*

A portion of the dialdehyde derivative from Example 1 was converted to a carboxyl derivative by mixing 55 g. of the former with 220 g. of 30 hydrogen peroxide solution. Water was then added to form 1100 cc. of solution, the peroxide content after dilution being 6%. Then 0.5% by weight of sulfuric acid was added to catalyze the decomposition of the peroxide. The mixture was heated for 5 hours at 90–95° C., and at the end of this period the mixture was filtered, there being obtained a white powder which was dried at room temperature.

*Example 8*

One hundred grams of the crystallite starting material of Example 1 were mixed with 60 grams of potassium dichromate and 80 g. of sulfuric acid (98%) and the resulting mixture was stirred into 3 liters of water. This mixture was allowed to stand 90 hours at room temperature and was then filtered and washed. It was dried at room temperature, yielding a white pasty product, comprising a mixed aldehyde- and carboxyl-containing derivative.

*Example 9*

A mixture of 100 g. of the crystallite starting material of Example 1, 300 grams of potassium permanganate, and 80 g. of 98% sulfuric acid was prepared and stirred into 3 liters of water. Reaction occured within ½ hour, the mixture coming to a boil without applying external heat. Filtration of the mixture was easily accomplished but it was difficult to wash out the manganese dioxide from the product comprising a mixed aldehyde and carboxyl derivative.

*Example 10*

The dialdehyde derivative was prepared by an electrolytic process. First, the following solutions were prepared:

(a) A solution containing 110 g. per liter of sodium iodate, (b) a solution of 264 g. per liter of sodium sulfate, and (c) a solution containing 46.6 g. per liter of acetic acid and 24.4 g. per liter of sodium acetate. These three solutions were combined to form 3 liters of an over-all solution having a pH of 2.7 and in this there were dispersed 200 g. of never-dried cellulose crystallites having a level-off average D.P. of 220. The never-dried material comprised 50% water and 50% of the crystallites. The dispersion was then placed in an electrolytic cell comprising a glass container having an anode of lead dioxide and a plurality of steel rods as a cathode and provided with stirring means. The solution was electrolyzed by passage of a direct current of 6 amperes therethrough at 8–10 volts. During the electrolysis, periodic acid was continuously formed at the anode and this material served to oxidize the cellulose crystallites. The electrolysis was carried out for a period of 16 hours, after which the electrolyte was filtered, and the filter cake washed with water to remove iodine compounds. The solid material was insoluble in water and had a copper number of 59.

Additional quantities of dialdehyde derivative were prepared by repeating the foregoing procedure but using an electrolysis time of 32 hours.

Example 11

A portion of the filtered, wet dialdehyde derivative of Example 1 was air dried to a moisture content of about 20% by weight and then placed in a Carver press where it was pressed at about 200° F. and 10,000 p.s.i. for 15 minutes to form a disc about ⅛ inch thick and 2¼ inches in diameter. The disc, identified as No. 1, was semi-transparent. At the same time another disc, No. 2, was made from the starting cellulose crystallite material using the same conditions. Disc No. 1 had an apparent density of 1.46–1.47, and No. 2 had an apparent density of 1.38. Upon placing the two discs in an atmosphere of 95% relative humidity at room temperature and observing the condition of the discs with time, the No. 1 disc formed from the dialdehyde derivative proved to be much more insensitive to moisture. Thus, after 24 hours the No. 1 disc was not substantially changed, whereas the No. 2 disc was soft and had swelled appreciably. Upon placing additional samples of the two discs in water, the No. 1 disc exhibited slight swelling but retained its shape for 24 hours (after which the test was discontinued), while the No. 2 disc disintegrated completely within minutes.

Example 12

Fresh samples of discs Nos. 1 and 2, prepared as in the preceding example, were subjected to dielectric tests together with a disc, identified as No. 3, comprising a high quality commercial dielectric made from cotton fabric. All three discs were used as dielectric materials and subjected for 168 hours to the action of an alternating current having a frequency of 1,000 cycles per second at a temperature of 70° F. and a relative humidity of 95%. At the end of this time the dielectric constants and dissipation factors of the materials were determined to be as follows:

|                     | No. 1  | No. 2  | No. 3  |
|---------------------|--------|--------|--------|
| Dielectric constant | 12.4   | 56.4   | 14.3   |
| Dissipation factor  | 0.102  | 0.402  | 0.282  |

While the dielectric constants for Nos. 1 and 3 are not significantly different, the dissipation factors do represent a significant difference, that of No. 1 being obviously superior. In identical tests, except that they were conducted at 57% relative humidity, the dielectric constants for Nos. 1, 2 and 3 were 7.7, 6.1, and 5.0, respectively, and the dissipation factors were 0.05, 0.03, and 0.106, respectively, and while these data are not significantly different they indicate that disc No. 1 comprising the dialdehyde derivative, is an effective material.

Example 13

Five discs were prepared, identified as A, B, C, D, and E. Disc A was made from 10 g. of cellulose crystallites having a level-off average D.P. of 220, the crystallites having the particle size and size distribution as described in Example 1. Disc B was made from 7.5 g. of the foregoing crystallite material and 2.5 g. of the dialdehyde derivative of Example 1. Disc C was made from 5 g. of the said crystallites and 5 g. of the said dialdehyde. Disc D was made from 2.5 g. of the crystallites and 7.5 g. of the dialdehyde; and disc E was made from 10 g. of the dialdehyde. All of the discs were pressed at 6,000 p.s.i. for ½ hour at 185° F. and in the presence of 15% moisture. As is apparent, the crystallites content of the discs ranged from 100% through 75%, 50%, and 25% to 0%; and conversely, the dialdehyde content ranged from 0% to 100%. The discs had a diameter of 2¼ inches and a thickness of ⅛ inch. Each was immersed in a beaker containing about 300 cc. of water at room temperature and were allowed to remain for 1¼ hours after which they were removed and examined. Disc A split after only 30 seconds in the water and began to flake after 3 minutes. It was very soft to the touch and disintegrated easily when handled. Upon placing the pieces back into the water and stirring, it dispersed easily. Disc B retained its shape throughout the period of immersion but swelled visibly. It was soft to the touch and broke easily; however, it did not disperse when placed in the water again and stirred. Disc C retained its shape and exhibited visible swelling only slightly at its edges; the disc was strong, and could be broken only after the application of considerable hand force; by applying the thumb nail against the edge of the disc one could cut into it slightly. Disc D retained its shape very well and did not exhibit any visible swelling even at its edges; it was difficult to cut into the edge with the thumb nail and very difficult to break by hand. Disc E appeared to be unchanged over its original condition. Its surfaces shed water very easily, unlike any of the other discs. It was very difficult to cut the edges by the thumb nail, and the disc could not be broken by hand.

It may be noted that if one carbonyl-containing group were formed in each original anhydroglucose unit of the crystallite aggregates, the resulting derivative would be said to have a D.S. (degree of substitution) of 1, whereas if two such groups were formed in each unit, the D.S. would be 2. While the D.S. of the derivatives described above is variable, in every case it is at least greater than 0.01.

By comparison with derivatives made from conventional fibrous cellulose, the derivatives of the aggregates are distinctive in several ways, as at least partly indicated by the examples. The aggregate derivatives are capable of a more simplified preparation, giving a clearer, cleaner, more homogenous product, and a greater amount of aggregates are enabled to take part in the reaction. Invariably the derivative has a particulate non-fibrous form, whereas derivatives of conventional fibrous cellulose are in fibrous form. Also, in the case of the crystallite aggregates a greater number of anhydroglucose rings tend to take part in the reaction. In particular, as noted in Example 1, the behavior, on drying at 65° C., of the dialdehyde derivative of the crystallites is unique; derivatives of conventional cellulose do not exhibit such behavior.

Although the invention has been described in connection with specific embodiments of the same, it will be understood that it is capable of obvious variations without departing from its scope.

In the light of the foregoing description, the following is claimed:

1. An oxidation derivative of cellulose crystallite aggregates having a D.S. of at least 0.01 and selected from the class consisting of aldehyde, carboxyl, and mixed aldehyde-carboxyl derivatives, said derivative being characterized by having a non-fibrous, particulate structure, and said derivative being a water-insoluble, water-dispersible solid material comprising the reaction product of cellulose crystallite aggregates and an oxidizing agent.

2. The oxidation derivative of claim 1 wherein said derivative is an aldehyde derivative.

3. The adlehyde derivative of claim 2 characterized by being a dialdehyde derivative and by being hydroplastic.

4. The dialdehyde derivative of claim 3 wherein the aldehyde groups are in the 2 and 3 carbon positions of at least a portion of the constituent anhydroglucose units of said derivative.

5. The oxidation derivative of claim 1 wherein said derivative is a carboxyl derivative.

6. The carboxyl derivative of claim 5 wherein the carboxyl groups are in the 6 carbon position of at least a portion of the constituent anhydroglucose units of said derivative.

7. The carboxyl derivative of claim 5 wherein the carboxyl groups are in the 2 and 3 carbon positions of at least a portion of the constituent anhydroglucose units of said derivative.

8. The oxidation derivative of claim 1 wherein said derivative is a mixed aldehyde-carboxyl derivative.

9. The oxidation derivative of claim 1 characterized by having a potential aldehyde group in the 1 carbon position of constituent end anhydroglucose units of said derivative.

10. The oxidation derivative of claim 1 characterized by having a hydroxyl group in the 1 carbon position of constituent end anhydroglucose units of said derivative.

11. The oxidation derivative of claim 1 characterized by having a carboxyl group in the 1 carbon position of constituent end anhydroglucose units of said derivative.

12. An oxidation derivative of cellulose crystallite aggregates having a D.S. of at least 0.01 and selected from the class consisting of aldehyde, carboxyl, and mixed aldehyde-carboxyl derivatives, said derivative being characterized by having an entirely crystalline, non-fibrous, particulate structure, by having an average level-off D.P. of 15 to 375 anhydroglucose units, by having a chemical purity of at least 95%, and by being a water-insoluble, water-dispersible solid material comprising the reaction product of cellulose crystallite aggregates and an oxidizing agent.

References Cited in the file of this patent

UNITED STATES PATENTS

| | | |
|---|---|---|
| 835,298 | Bell | Nov. 6, 1906 |
| 2,758,112 | Waning | Aug. 7, 1956 |
| 2,978,446 | Battista et al. | Apr. 4, 1961 |